Feb. 21, 1961        N. ANTON        2,972,678
AIR PARTICLE MONITOR

Filed July 5, 1955        2 Sheets-Sheet 1

INVENTOR.
NICHOLAS ANTON
BY Darby & Darby
ATTORNEYS

Feb. 21, 1961 N. ANTON 2,972,678
AIR PARTICLE MONITOR
Filed July 5, 1955 2 Sheets-Sheet 2

INVENTOR.
NICHOLAS ANTON
BY Darby & Darby
ATTORNEYS

United States Patent Office 2,972,678
Patented Feb. 21, 1961

2,972,678
AIR PARTICLE MONITOR
Nicholas Anton, 1226–1238 Flushing Ave., Brooklyn 6, N.Y.
Filed July 5, 1955, Ser. No. 519,830
15 Claims. (Cl. 250—43.5)

This invention relates to a system which will by novel mechanical and electrical means, monitor the amount of radio-active particles in air to be tested. In a preferred embodiment a continuously moving filter tape is passed through an air stream at a steady rate. Means are provided according to novel features of the invention to maintain this constant speed and while keeping the tape taut and free of slack as it unwinds from a supply reel and winds up on a take up reel. Should the system fail electrically or should the tape stop or slow down its movement, suitable alarm means are provided responsive thereto in accordance with other features of the invention, for calling attention to this improper condition.

Accordingly, it is an object of the present invention to provide a novel system for detection of radio-activity in air, using a continuously moving filter medium for collecting radio-active particles.

It is another object of the present invention to provide improved and novel means for maintaining tautness and preventing slack in a continuously moving tape or other web.

It is a further object of the present invention to provide improved and novel means for determining undesired slow down or halting of a continuously moving web or tape, particularly adapted for such tapes or webs moving at very slow speeds, measured in fractions of inches per hour.

The object of the invention will be better understood from the illustrative embodiment described in the following specification and shown in the accompanying drawings which form part of this application in which.

Figure 1:
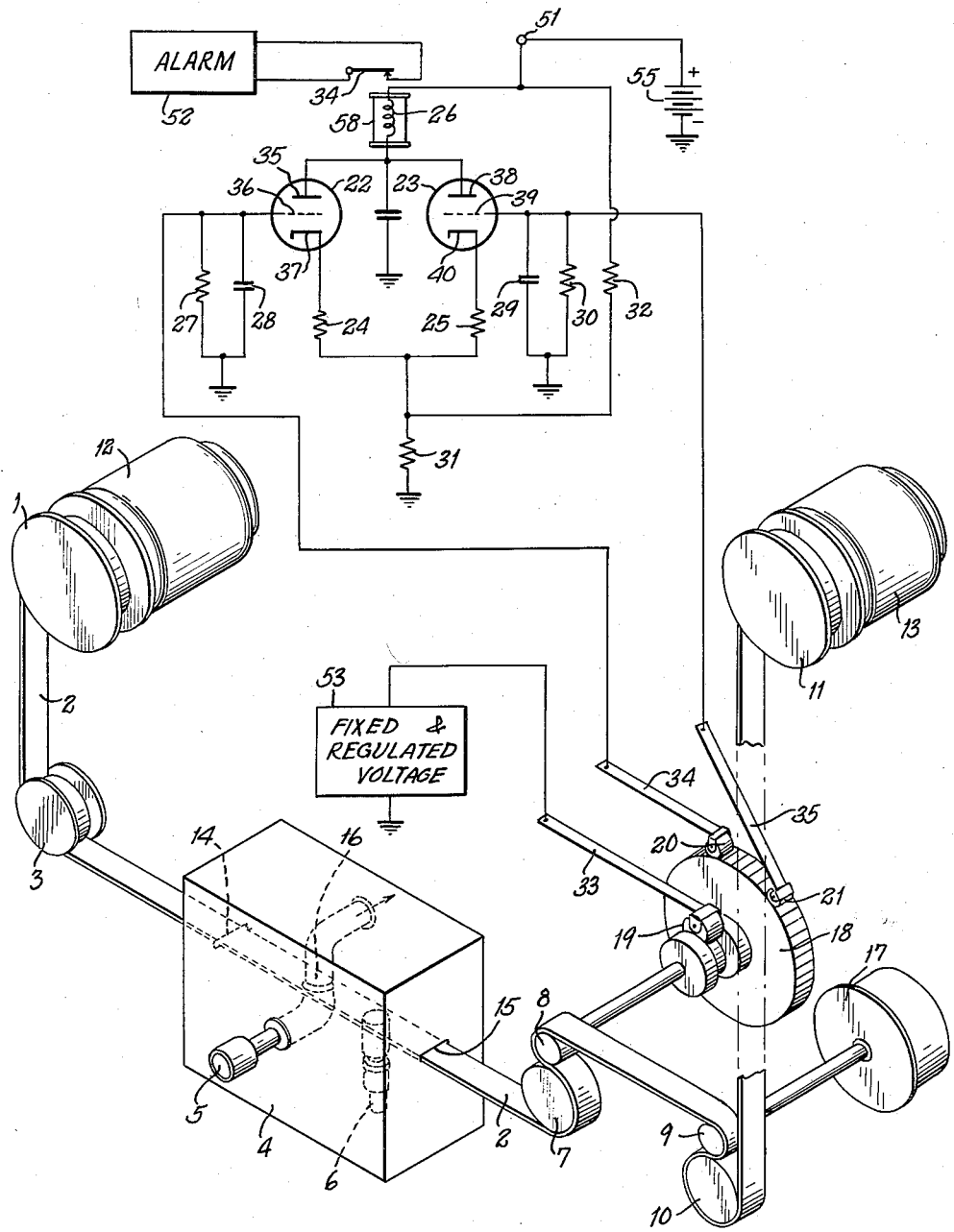
Figure 1 is a schematic isometric view and diagrammatic wiring diagram of the system of the present invention.

Referring to the figures of the drawing, the system of the present invention comprises a supply reel 1 on which a continuous filter-paper tape 2 is wound. Filter-paper tape 2 then passes over idler wheel 3 and enters enclosure 4 through a narrow opening 14. Upon emerging from enclosure 4, through narrow exit opening 15, the filter-paper tape 2 passes over a rubber pressure roller 7, a driven shaft 8, a driving shaft 9 and a rubber pressure roller 10 to take up reel 11. For driving the filter-paper tape 2, a non-stalling synchronous motor 17 is geared to the driving shaft 9, which is knurled or otherwise roughened at the end engaging tape 2 to eliminate slippage.

As tape 2 passes through enclosure 4 at a slow speed (for example ⅝ inch per hour) it is subjected to air flow which may be contaminated with radio-activity. Thus contaminated air enters pipe 5 which terminates just below tape 2. Outlet pipe 16 starts just above tape 2 in alignment with pipe 5 and conveys exhaust air outwardly of enclosure 4. The gap between pipes 5 and 16 is so narrow that substantially all air must flow through tape 2, which is airpermeable and filters out any radio-active particles, which then remain in the tape. The tape 2 then passes over a radiation detection tube 6 of any conventional type, such as a Geiger-Muller tube, which is connected to a suitable conventional indicator or alarm circuit to indicate either the amount of radio-activity or when an excessive intensity of radio-activity exists. In this way the system continuously monitors the air for radio-activity and can give an alarm when excessive intensities are encountered.

It will be readily apparent that a continuous and uniform tape speed is important in this system, since only then is the concentration of radio-activity on the tape a true indication of the original concentration of radio-activity in the contaminated air.

Figure 3:
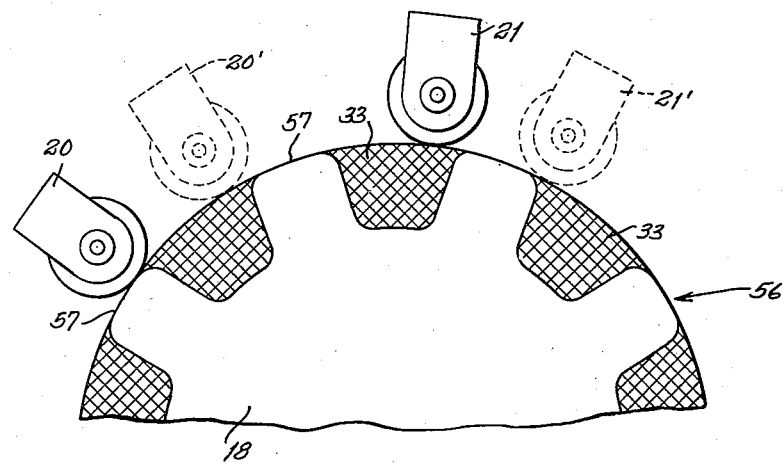
Figure 3 is a fragmentary cross sectional view of the commutator arrangement of the system of Figure 1.

Another feature of the present invention is the provision of automatic electronic alarm means for determining if for any reason the filter-paper tape should slow down excessively or entirely cease to move. It is apparent that a tape speed of the order of ⅝ inch per hour (a desirable speed selected because of economy in operation and to assure sufficient collection of radio-active particles thereon for efficient indication) is so slow that visual examination of the tape would not be sufficient to ascertain its motion or whether it has stopped, and conventional speed indicating means are unsuitable. According to the present invention tape 2 is utilized as a belt driving a ball bearing mounted metal shaft 8 to which is secured a commutator 18. Commutator 18, as shown in Figure 3, is preferably manufactured from a standard metal gear with its tooth depressions 33 filled with a suitable electrical insulator and ground and polished to provide a uniformly smooth cylindrical outer surface 56 with the tops of each tooth 57 available for electrical contact. This provides a plurality of insulated segments and a like number of conductive segments. A spring tensioned roller contact 19 is mounted in contact with shaft 8 and is thereby caused to be in electrical contact with all the conductive segments of commutator 18. Similar spring tensioned roller contacts 20 and 21 are mounted in contact with the periphery of commutator 18 in such manner that at no time are both roller contacts 20 and 21 touching conductive segments. This is accomplished by making the insulated commutator segments slightly longer peripherally than the conductive segments. For example, a ratio of lengths of 8 to 7 is suitable. The rollers 20 and 21 are then spaced by a distance slightly greater than the peripheral width of a conducting segment 57, and slightly less than the peripheral width of an insulating segment 33 (or such distance plus an integral multiple of the gear tooth pitch), so that one roller will leave a conductive segment 57 before the other arrives at such a segment 57 as shown in Figure 3.

A suitable source of fixed voltage 53 has its positive terminal connected to spring roller contact 33, the negative terminal being grounded.

Shaft 8 and the commutator body 56 being conductive, this causes each tooth contact 57 on the circumference of the commutator 18 to have the same potential as the source 53. When either roller contact 20 or 21 touches a conducting tooth segment 57 of commutator 18, the full fixed positive potential is thus applied thereto.

Roller contact 20 is connected directly to the grid 36 of an electron tube 22, and roller contact 21 to the grid 39 of a second tube 23. Tubes 22 and 23 may be independent or formed as a twin tube, preferably of triode type although other grid-controlled tube types including transistors may be used. The anodes 35, 38 of tubes 22, 23 are connected together and through the winding 26 of a relay 58 to the positive terminal of a source 51 of plate voltage whose other terminal is grounded. Cathode 37 of tube 22 is connected to a cathode biasing resistor 24 and cathode 40 of tube 23 is connected to a similar biasing resistor 25. The two resistors 24, 25 are connected to ground through a common resistor 31, which is part of a voltage divider 31, 32 between terminal 51 and ground, whereby the voltage across resistor 31 provides a fixed common bias for tubes 22, 23. Each grid 36, 39 is connected to ground by a respective resistance-capacitance time constant network formed by parallel connected capacitor 28 or 29 and resistor 27 or 30.

As is well known in the art, the time for a voltage in an R–C network to decay to 37% of its initial value is given by the formula $$t = RC$$

where $t$ is known as the circuit time constant and is the time in seconds, R is the resistance in ohms and C is the capacitance in farads. In the present case, circuits 27—28 and 29—30 are chosen to have equal and extremely long time constants. For example, resistors 27 and 30 may be 44 megohms and capacitors 28 and 29 may be 4 microfarads, yielding time constants of 176 seconds.

Relay coil 26 is so adjusted that the combined anode currents of tubes 22 and 23 will be required to hold its relay contact 34 in its closed position. If either tube 22 or 23 ceases to conduct, or a sufficient reduction in its anode current occurs, the relay contact 34 will open its circuit to actuate a suitable visual or audio alarm means indicated schematically at 52.

In the example hereinbefore given, the tape drive motor 17 may rotate at 1 revolution per hour and the drive shaft 9 may be dimensioned to pull filter-paper tape 2 at speed of 5/8 inch per hour. The tape turns driven shaft 8 and commutator 18 which, in one example, has a diameter of 3 to 4 inches and may rotate at the rate of 1.7 revolutions per hour. If there are 72 teeth on the commutator circumference, a complete cycle in which a roller 20 or 21 traverses a full insulating segment and a full conductive segment occurs in 30 seconds; a roller contact will be on a conductive segment 57 for 14 seconds and on an insulated segment 33 for 16 seconds, making 30 seconds for the complete cycle.

Considering roller contact 20, upon its contact on a conductive tooth segment 57, full charging voltage is applied to grid 36 of vacumm tube 22 from the fixed regulated source 53 and capacitor 28 becomes fully charged substantially at once. This is indicated at point A of Figure 2, which shows in solid line a graph of the voltage between grid 36 and ground, and in dotted line the voltage between grid 39 and ground. Capacitor 28 remains charged while roller 20 is in contact with this conductive commutator segment 57 for the remainder of the 14 second period or until point B of Figure 2. After those 14 seconds, roller contact 20 leaves that conductive segment, and capacitor 28 discharges through resistor 27 causing the potential on the grid 36 of tube 22 to decay until point C, 16 seconds later. As before stated the time constant of RC network 27 and 28 is very long, such as 176 seconds. Thus only a slight drop in voltage occurs during the 16 second period that roller contact 20 is in the following insulating segment 33. Following non conducting or off period from B to C or a total time lapse of 30 seconds from the start of the cycle at A, a new similar cycle occurs and this is repeated periodically as shown at CKLMN in Figure 2.

It is apparent that tube 22 is self biased by cathode resistance 24. When no positive voltage is applied to grid 36, little current flows to plate 35 and through relay coil 26. However as is well known, when capacitor 28 becomes fully charged by applying a positive potential, grid 36 becomes highly positive causing maximum plate current flow.

Figure 2:
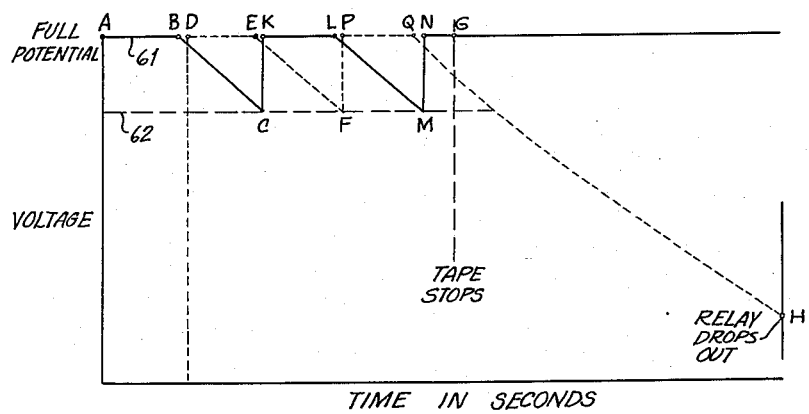
Figure 2 is a graphical representation useful in explaining the operation of the alarm timing circuit thereof.

During the period from B to C in Figure 2 when the positive potential of the regulated source is removed from grid 36, the slow discharge rate of the RC network 27 and 28 maintains grid 36 at a sufficiently positive potential to assure ample current flow through relay coil 26.

Similarly tube 23 has identical resistance-capacitance components 29 and 30 in the circuit of its grid 39. Roller contact 21 is so placed upon the circumference of commutator 18 that the positive potential from source 53 is applied to grid 39 after contact 20 leaves its conducting tooth segment. In the example given the time delay here may be 1 second.

Referring to the dotted curve in Figure 2, positive potential is applied to capacitor 29 and to grid 39 at point D, and remains until point E 14 seconds later, when roller 21 leaves its conducting segment. Then the voltage of capacitor 29 decays until F, at which time contact 21 touches the next conductive segment. Hence, both grids are maintained at potential levels of between 60 and 61 at all times.

As before stated only the combined plate currents of tubes 22 and 23 will be sufficient to hold relay 34. If for any reason filter tape 2 stops its motion, both roller contacts 20 and 21 will either be off conducting segments or one will be on and the other off. At no time will both contacts be on conducting segments at the same moment according to the design of the present invention as shown in Fig. 3.

Therefore, assuming filter paper 2 stops its linear motion, as at a point G of Figure 2, both roller contacts will likewise stop their peripheral travel. If one contact comes to rest on a conducting segment, the grid circuit of that contact (for example, grid 36) will continue to have maximum positive potential and tube 23 will conduct maximum current. The other tube, such as 23 however, will slowly lessen its plate current due to the discharge of the RC network 29—30. At the end of a predetermined period, such as 120 seconds, shown at point H, although maximum current is still flowing in one tube, so little current is flowing in the other that the combined currents flowing in relay coil 26 are not sufficient to hold relay contact 34 closed. At that point the release of relay 34 will cause alarm 52 to operate to indicate failure of the system.

It will be apparent that the values of time intervals, time constants and speeds given herein are illustrative only. The only essential requirement for the time constants of circuits 27—29 and 29—30 is that these time constants be long (i.e., at least 8 times) compared to their discharge interval as determined by the duration of dwell of a roller contact on a commutator insulated segment.

It will be understood that the same operation will occur if the tape, instead of stopping completely, merely slows down enough so that one roller contact will remain on its non-conductive segment long enough to permit the long time constant circuit voltage to decay to the point where relay 26 drops out. Thus this system provides a simple and reliable means for checking the continued movement of the tape even for extremely slow speeds, although it may be useful also at other speeds.

It will be apparent that for proper operation, the tape 2 must be kept taut as it passes over the air inlet pipe 5. The present invention provides a simple means for accomplishing this purpose, for which a hysteresis motor 12 is coupled to supply reel 1 and a similar motor 13 is coupled to take up reel 11. Suitable motors of this type are commercially available, being manufactured by Haydon Mfg. Co. Inc. and designated as their "1600 series." It has been discovered that such motors may be stalled indefinitely without serious overheating, and exert a continuous torque even when stalled. This characteristic permits the use of such motors for slack take-up, avoiding the necessity of complicated slip clutches and reducing mechanisms which wear appreciably in use.

As motor 17 drives filter-paper tape 2 by drive shaft 9, take up reel 11 is aided in its function by motor 13 mounted on the shaft of take up reel 11. Motor 13 is geared or designed to revolve at a speed considerably faster than the speed of filter-paper tape 2, which in the example given travels at ⅝ inch per hour. Motor 13 may then have a speed of 1 revolution per minute. Filter-paper tape 2, in winding on take up reel 11, is tightened and slack removed by motor 13 rotating in a direction to reel up the filter paper tape 2 (clockwise in the figure). When filter-paper tape 2 becomes taut and there is no additional slack to be taken up the design characteristics of motor 13 allows the motor to stall and remain so stalled while exerting a constant force on the now tightly wound filter-paper tape 2 irrespective of the action of the driving shaft 9. As driving shaft 9 pulls more tape off supply reel 1, take up motor 13 continuously rotates take up reel 11 at a corresponding rate and maintains uniform torque on it to tension tape 2.

Similarly, a motor 12 of the same type is mounted on the shaft of suply reel 1. Motor 12 is designed to revolve at a speed higher than that of motor 13; in the example given, it may have a speed of 10 revolutions per minute, and in a direction opposed to the movement of filter-paper tape 2. It thereby keeps exerting a constant rearward tension on the tape, removing all slack. Once motor 12 pulls the tape 2 tautly against supply reel 1, it may remain stalled or move slowly without injury to itself while exerting this pull on the tape. By designing the motor 12 to have a normal higher speed than that of motor 13, its torque will be less, so that the drive shaft 9 will have little difficulty in overcoming the rearward pull on the tape exerted by motor 12. It thus allows the tape to be withdrawn from the supply reel 1 in a counter clockwise direction against the clockwise torque exerted by motor 12.

As indicated above constant tape speed is desirable to maintain proper operation and any slack in the tape may cause improper operation. Hence the combined use of hysteresis motors 12 and 13 and pressure rollers to maintain tautness is important. It will be seen that motors 12 and 13 thus provide constant pulls on tape 2 no matter what their rotational positions may be, which pulls are continuously applied to the tape at all times, both for take-up on reel 11 and for slack prevention.

Accordingly the present invention has provided a simple and reliable air monitor, with special means for maintaining the tape taut and for detecting undesirable tape slow down or stoppage. It will be apparent that these tautness-maintaining and speed-detection arrangements are not limited for use in the present complete system, but may be used generally.

Also, the speed-detecting apparatus described above is in no way limited to use with a moving tape. Clearly, it can be used with respect to any continuously moving element, such as a wire, a filament, a web, a shaft, a belt, a drum, etc., so long as commutator 18 or its equivalent is actuated synchronously with the moving element, by any desired means.

Similarly, the invention is not limited to the use of a commutator as illustratively described. The essential feature thereof is the cyclical and periodic interruption of the condenser-charging circuits, in nearly opposite phase so that both condensers are not charging at the same instant. Any kind of circuit interrupters or breakers may be used, in the proper timed operation.

It is also to be understood that the foregoing description is illustrative only and is not to be taken in a limiting sense, the present invention being defined solely by the appended claims.

What is claimed is:

1. An air particle monitor comprising a supply reel, an air-permeable tape wound on said supply reel, a take-up reel having the other end of said tape wound thereon, an enclosure surrounding a portion of said tape between said reels, air piping means having an air inlet pipe with an opening adjacent one face of said tape within said enclosure and having an outlet pipe having an opening on the other side of said tape in registration with said first opening, whereby air to be monitored passing through said piping means must flow through said tape, means in said enclosure adjacent said tape receptive to radioactive material on said tape for providing an indication of the presence of such material, a conductive shaft in contact with and driven by said tape, a commutator secured to and rotatable with said shaft and having electrically connected conductive segments on the circumference thereof separated by intervening insulated segments and electrically connected to said conductive shaft, a roller contact in electrical rolling contact with said driven shaft and thereby in contact with said conductive segments, a source of positive potential coupled to said contact, a pair of additional roller contacts in rolling contact with the circumference of said roller commutator, said additional rolling contact being spaced so that at no time can both such latter contacts touch conductive segments of said commutator, a driving shaft in contact with and adapted to drive said tape, motor means coupled to said driving shaft for continuously rotating said driving shaft to drive said tape at a uniform linear speed and means coupled to said contacts for indicating reduction of the linear speed of said tape below a predetermined value.

2. In an air particle monitor, in combination, a filter tape, means for passing air to be monitored therethrough, means for detecting radioactive particles deposited upon said tape, a supply reel for said tape, a take-up reel for said tape, motor means for driving said filter tape from said supply reel to said take-up reel, additional motor means coupled to said take-up and supply reels to keep said filter tape taut and free from slack, a commutator driven by said filter tape, contact means upon said commutator, circuit means connected to said contact means, said circuit means including relay means, normally inoperative alarm means associated with said relay means, and means in said circuit means for causing said alarm means to become operative should said filter tape slow down to less than a predetermined speed or stop.

3. In an air particle monitor, in combination, a filter tape, means for passing air to be monitored therethrough, means for detecting radioactive particles deposited upon said tape, a supply reel for said tape, a take-up reel for said tape, a non-stalling synchronous motor, driving means coupled to said motor for pulling said filter tape from said supply reel to said take-up reel, additional motor means comprising a stallable hysteresis motor coupled to said supply reel for applying a force to said filter tape holding said tape taut while allowing said tape to unwind from said supply tape, additional motor means comprising a stallable hysteresis motor coupled to said take-up reel normally operating to pull said filter tape in the same direction as said driving means and holding said tape taut against said take-up reel and thereby removing slack.

4. In an air particle monitor, in combination, a filter tape, means for passing air to be monitored therethrough, means for detecting radioactive particles deposited upon said tape, a supply reel for said tape, a take-up reel for said tape, motor means for driving said filter tape from said supply reel to said take-up reel, additional motor means coupled to said take-up and supply reels to keep said filter tape taut and free from slack, a commutator driven from said filter tape and having conductive and insulated segments upon its circumference, a source of fixed positive regulated voltage connected to said conductive segments, contact means upon said circumferential segments, a relay circuit, means coupling said relay circuit to said contact means for applying said source of fixed positive regulated voltage as information pulses to said relay circuit, and alarm means coupled to said relay means for indicating the slowing down or stoppage of said filter tape.

5. An air particle monitor comprising an air-permeable tape, means for driving said tape at a substantially uniform linear speed, rate of tape speed detector means for generating an indicator signal in response to said tape speed falling below a predetermined minimum, control means for maintaining substantially uniform tape travel, means at a fixed point along the path of said tape for causing air to be monitored to flow through said tape, whereby any radioactive particles in said air will be deposited upon said tape, and stationary means displaced from said last-named means in the direction of tape travel for detecting the radioactive condition of said tape during movement thereof.

6. A tape transport mechanism comprising a non-stalling synchronous motor, driving means through which motion is imparted to said tape from said synchronous motor, a supply reel for said tape wound therein, a take-up reel having the other end of said tape wound thereon, a stallable hysteresis motor suitably mounted upon said supply reel and operating in a counter direction to said tape thereby holding said tape taut but allowing said tape to unwind, an additional stallable hysteresis motor suitably mounted upon said take-up reel operating in a direction to said tape removing slack and further maintaining tautness of said tape to provide a uniform linear speed for said tape.

7. A transport mechanism for an elongated flexible element comprising a supply reel adapted to have said element coiled thereon, drive means for pulling said element from said supply reel, slack take-up means coupled to said supply reel and opposing said pull to maintain said element taut, a take-up reel adapted to have said element coiled thereon from said drive means, and motor means coupled to said take-up reel for continuously rotating said take-up reel and applying a continuous pull on said element, both said slack take-up means and said motor means comprising a continuously stallable rotary motor.

8. Apparatus for indicating slow-down or stopping of a continuously moving tape comprising a commutator having a conductive body and insulated and conductive segments, said conductive segments being in electrical connection with said conductive body, means for driving said commutator from said tape whereby said commutator moves synchronously with said tape, a source of fixed potential, means connecting said source to the said commutator body, a pair of fixed contacts spaced around the periphery of said commutator and in contact therewith and so spaced that said contacts cannot both touch conductive commutator segments at any single instant, a pair of electron tubes each having an anode, a cathode and a control electrode, means connecting said anodes directly together, a source of plate supply for said tubes, an output element coupled between said plate supply source and said anodes, a respective time-constant circuit connected between the cathode and control electrode of each of said tubes, each said time-constant circuit including a charging capacitor and a discharge circuit therefor, and means connecting each of said fixed contacts to a respective time-constant circuit, whereby each of said charging capacitors is supplied with energy from said positive potential source when its respective fixed contact is in engagement with a conductive commutator segment and is permitted to discharge when its respective contact is in engagement with an insulated commutator segment, each of said time-constant circuits having a time constant long in comparison with the period of time either of said contacts is in engagement with a conductive segment and its following insulated segment during normal speed movement of said tape, whereby the amount of excitation of said output element is an indication of the continued normal rotation of said commutator and the continued normal speed movement of said tape.

9. Speed indicating apparatus for a continuously moving element comprising a pair of charging condensers, a respective discharge circuit connected to each of said condensers, a source of charging potential, means coupling said source to each of said condensers, said coupling means comprising a charging circuit for each of said condensers and a pair of synchronized circuit breakers each adapted to interrupt a respective charging circuit, means cyclically operating said circuit breakers to open and close said charging circuits synchronously with the continuous movement of said element, said last means causing said breakers to be operated so that at no single instant of time are both said charging circuits closed and indicator means coupled to said condensers and responsive to the sum of the voltages across said condensers, each of said condensers and its discharge circuit having a time constant long in comparison to the period of one complete cycle of operation of each of said circuit breakers at the normal speed of operation of said element, whereby upon slow-down or stoppage of said element, said voltage sum will decrease from its normal value to yield an indication of said slow-down or stoppage.

10. Speed indicating apparatus for a continuously moving element comprising a pair of condensers, a respective discharge circuit coupled to each of said condensers, a respective charging circuit for each of said condensers, means for interrupting said charging circuits cyclically in synchronism with the movement of said element and substantially in opposite phase with respect to each other, with said two charging circuits never both closed at the same instant, said condensers and discharge circuits having time constants long in comparison to the period of the cycle of said circuit interruption at normal speeds of said element, and indicator means responsive to the sum of the voltages across said condensers.

11. An air particle monitor comprising a tape adapted to collect discrete solid particles, means for driving said tape at a controlled speed, means detecting rate of speed of said tape and generating an indicator signal in response to the rate of speed of said tape falling below a predetermined minimum, means at a fixed point along the path of said tape for causing air to be monitored to flow against said tape, whereby radioactive particles in said air will be mechanically deposited upon said tape, and detection means, displaced from said last named means in the direction of tape travel, for detecting the radioactive condition of said tape during movement thereof.

12. In an air particle monitor, in combination, a filter tape, means for passing air to be monitored therethrough, means for detecting radioactive particles deposited upon said tape, a supply reel for said tape, a take-up reel for said tape, means for driving said filter tape from said supply reel to said take-up reel with said filter tape substantially taut and free from slack, cyclically operable switching means driven by said filter tape, circuit means connected to said switching means, said circuit means including relay means, normally inoperative indicator means associated with said relay means, and further means in said circuit means for causing said indicator means to become operative should said filter tape slow down to less than a predetermined speed or stop.

13. In an air particle monitor, in combination, a filter tape, means for passing therethrough air containing radioactive particles to be monitored, a supply reel for said tape, a take-up reel for said tape, means for driving said filter tape from said supply reel to said take-up reel with said filter tape substantially taut and free from slack, means for detecting radioactive particles deposited upon said tape, cyclically operable switching means driven by said filter tape, normally inoperative indicator means associated with said switching means, and further means for causing said indicator means to become operative should said filter tape slow down to less than a predetermined speed or stop.

14. Speed indicating apparatus for a continuously moving element comprising a pair of condensers, a respective discharge circuit coupled to each of said condensers, a respective charging circuit for each of said condensers, means for interrupting said charging circuit responsive to the movement of said element with said two charging circuits never both closed at the same instant, and indicator means responsive to the sum of the voltage across said condensers, whereby the sum of the voltages across said condensers will fall to substantially the voltage of one of said charging circuits thus causing an indication at said indicator means when said element has a speed below that corresponding to a time of interruption of one of said charging circuits long compared to the time constant of said condenser discharge circuits.

15. A tape transport mechanism as in claim 6, wherein said stallable hysteresis motor mounted on said take-up reel is operated at a speed greater than said tape and said stallable hysteresis motor mounted on said supply reel is operated at a speed greater than that of said stallable hysteresis motor mounted upon said take-up reel.

References Cited in the file of this patent

UNITED STATES PATENTS

| | | |
|---|---|---|
| 2,451,816 | Dunn | Oct. 19, 1948 |
| 2,576,616 | Livingston | Nov. 27, 1951 |
| 2,640,788 | Rockett | June 2, 1953 |
| 2,734,377 | Traver | Feb. 14, 1956 |

OTHER REFERENCES

Kuper et. al.: "Monitor for Radioactive Duct," Nucleonics, vol. 6, No. 4, pages 44 to 47, April 1950.

"Monitor Measures Air and Surface Contamination" by Watts et al., Nucleonics, January 1955, vol. 13, No. 1, pp. 51 and 52.